United States Patent [19]

Takikawa et al.

[11] Patent Number: 4,747,002
[45] Date of Patent: May 24, 1988

[54] DISK CLAMPING MECHANISM

[75] Inventors: Makito Takikawa; Motohiro Shimaoka, both of Furukawa, Japan

[73] Assignee: Alps Electric Co., Ltd., Japan

[21] Appl. No.: 886,208

[22] Filed: Jul. 15, 1986

[30] Foreign Application Priority Data

Jul. 15, 1985 [JP] Japan .................. 60-106872[U]

[51] Int. Cl.$^4$ .................... G11B 17/028; G11B 5/016; A63D 7/00
[52] U.S. Cl. ...................................... 360/99; 369/270
[58] Field of Search .................. 360/99, 133, 135, 86, 360/97; 369/261, 270, 271

[56] References Cited

U.S. PATENT DOCUMENTS

| 3,898,814 | 8/1975 | Chou et al. | 369/261 X |
| 3,965,485 | 9/1974 | Morin | 360/86 X |
| 4,068,851 | 1/1978 | Yamamura | 360/97 X |
| 4,339,778 | 7/1982 | Wise | 360/99 |
| 4,420,830 | 12/1983 | Green | 369/261 |
| 4,539,614 | 9/1985 | Thompson | 360/99 |
| 4,577,248 | 3/1986 | Cantwell | 360/97 |
| 4,592,040 | 5/1986 | Ohsaki | 369/270 X |

FOREIGN PATENT DOCUMENTS 59-22272 2/1984 Japan .................. 360/99

Primary Examiner—Stuart N. Hecker
Assistant Examiner—Benjamin E. Urcia
Attorney, Agent, or Firm—Guy W. Shoup

[57] ABSTRACT

A disk clamping mechanism for a disk driving device employed in an apparatus for writing information in a disk and reading the information recorded in a disk, such as a recording/reproducing apparatus, has a rotary system including a hub for centering a disk relative to and pressing the disk against the spindle hub of the disk driving device and a collet for pressing the hub toward the spindle hub, and a nonrotational system including carrier for moving the rotary system toward and away from the spindle hub, a collet supporting member supporting the collet and fastened to the carrier, a ball receptacle loosely fitted in the collet supporting member, and a spring urging the collet supporting member and the ball receptacle away from each other. The rotary system and the nonrotational system are joined by means of a spherical tip or a conical tip at a position on the lower side toward the spindle of the disk driving device below to a disk clamping surface so that tilting of the hub is corrected as the hub is fitted in the spindle hub attached to the spindle.

6 Claims, 5 Drawing Sheets

DISK CLAMPING MECHANISM

BACKGROUND OF THE INVENTION

1. Field of the Invention

The present invention relates to a disk clamping mechanism for a disk driving device, for clamping a disk-shaped recording medium and, more particularly, to a disk clamping mechanism suitable for clamping a flexible disk, namely, a so-called floppy disk.

2. Description of the Prior Art

A so-called disk, driving device which drives a flexible disk (hereinafter "disk") rotatively for recording information or reproducing the recorded information is constituted so as to center a disk in reference to the central hole of the disk, to clamp the disk along the periphery of the central hole and to drive the disk rotatively. Since such a disk is flexible, various problems arise in clamping the disk. A conventional disk clamping mechanism and problems involved therein will be described in connection with the accompanying drawings.

Referring to FIG. 4 illustrating a conventional disk clamping mechanism, a spindle hub 2 is attached to the upper end of a spindle 1 which is driven by a motor, not shown, and a flexible hub 4 consisting of a plurality of segments is supported loosely on a shaft 3 so as to be fitted in a cavity 2b defined by the annular wall 2a of the spindle hub 2. A collet 5 is mounted rotatably through a bearing 7 on the shaft 3 above the flexible hub 4. A pressure plate 9 and a carrier 12 are fitted loosely on the shaft 3 above the collet 5. Compression coil springs 6 and 8 are disposed between the hub 4 and the collet 5 and between the bearing 7 and the pressure plate 9, respectively. The compression coil spring 6 functions to separate the hub 4 and the collet 5 from each other, while the compression coil spring 8 functions to apply pressure to a disk 11. The resilient force of the compression coil spring 8 is greater than that of the compression coil spring 6. An E-ring 10 is attached to the upper end of the shaft 3 to retain the hub 4, the collet 5, the pressure plate 9 and other members mounted on the shaft 3.

In clamping the disk 11 by the disk clamping mechanism thus constituted, first the disk 11 is mounted on the spindle hub 2 at a predetermined position, and then the carrier 12 is lowered to move the members mounted on the shaft 3 toward the spindle hub 2. Then, the lower portion of the hub 4 enters the cavity 2b enclosed by the annular wall 2a of the spindle hub 2, and then the lower surface of the flange 4a of the hub 4 is brought into contact through the disk 11 with the spindle hub 2. As the carrier 12 is lowered further, the collet 5 comes into contact with the inner taper surface 4b of the hub 4, and thereby the further downward movement of the collet 5 relative to the hub 4 is limited. As the carrier 12 is lowered further thereafter, the collet 5 is forcibly pushed into the central portion of the hub 4 by the resilient force of the compression coil spring 8 to expand the segments of the hub 4 so that the disk 11 placed on the upper surface of the annular wall 2a of the spindle hub is centered and is clamped between the spindle hub 2 and the hub 4. Then, the spindle hub 2 is rotated by the motor so that the spindle hub 2, the hub 4, the collet 5 and the disk 11 rotate together for recording or reproducing. The smooth rotation of the rotary members of the disk clamping mechanism and the disk 11 is secured by the bearing 7. However, such a configuration has a problem that mounting the rotary members, namely, the hub 4, the collet 5 and the bearing 7, on the shaft 3 requires the axial length of the shaft 3 to be large and the construction of the bearing 7 to be complicated. An invention disclosed in Unexamined Japanese Patent Publication (Kokai) No. 59-22272 was proposed to solve such a problem. As illustrated in FIG. 5, this proposed invention employs a rotary member and a nonrotational member interconnected so as to be able to clamp the disk, instead of employing a shaft member, such as the shaft 3, for supporting the rotary members. This proposed invention will be described hereinafter with reference to FIG. 5.

The disk clamping mechanism comprises a spindle hub 2, a flexible hub 4 capable of being fitted in a cavity 2b enclosed by the annular wall 2a of the spindle hub 2 and pressing a disk 11 with the flange 4a thereof, a collet 5 capable of pushing the lower inside of the hub 4, a ball retainer 17 engaging the collet 5 and having a central ball retaining protrusion 17a, a ball 13 retained in the central ball retaining protrusion 17a, a spring seat 15 rotatably placed on the ball 13, a holder 16 for holding a spring 14 and the spring seat 15, a carrier 12 capable of moving the collet 5 and the hub 4 downward by the holder 16, and a spring 18 interposed between the hub 4 and the collet 5 to separate the hub 4 and the collet 5 from each other. The hub 4, the collet 5, the ball retainer 17 and the spring 18 are rotary members, while the carrier 12, the holder 16, the spring 14 and the spring seat 15 are nonrotational members. Only the single ball 13 is interposed between the rotary members and the nonrotational members and functions as both a radial bearing and a thrust bearing.

This disk clamping mechanism does not need the shaft 3 and the bearing 7 of the above-mentioned disk clamping mechanism.

Nevertheless, both the above-mentioned conventional disk clamping mechanisms have a problem in centering the disk 11 on the spindle hub 2 and clamping the same between the spindle hub 2 and the flexible hub 4. When the hub 4 is brought into contact with the annular wall 2a of the spindle hub 2 in a tilted position, the tilt of the hub 4 is enhanced by the annular wall 2a, and hence the centering of the disk 11 cannot be achieved satisfactorily. Since the hub 4 is pushed further toward the spindle 1 in a tilted position by the collet 5, the accurate centering of the disk 11 is impossible. Furthermore, since the hub 4 is pressed against the disk 11 in a tilted position, the uniform and accurate clamping of the disk is impossible. In the worst case, part of the periphery of the central hole of the disk 11 is bent accidentally toward the annular wall 2a of the spindle hub 2.

Such a problem is considered to be due to a reason that the center 0 of the swing motion of the hub 4 and the collet 5 is located above a contact edge 4c where the hub 4 comes into contact first with the annular wall 2a of the spindle hub 2. When the center 0 of swing motion is located above the contact edge 4c, a reaction force A acting perpendiculary to the inner surface of the annular wall 2a and a reaction force acting in parallel to the inner surface of the annular wall 2 act on the hub 4 when the hub 4 is brought into contact with the annular wall 2 of the spindle hub 2 in a tilted position as illustrated in FIG. 6. The reaction force A perpendicular to the inner surface of the annular wall 2a produces a moment $M_1$ of force tending to turn the hub 4 and the collet 5 in a clockwise direction, as viewed in FIG. 6.

As obvious from FIG. 6, the moment $M_1$ of force tends to increase the tilt of the hub 4, and hence the hub 4 is unable to center the disk accurately when tilted in such a position. On the other hand, when the center 0 of swing motion of the hub 4 and the collet 5 is located below the disk clamping surface as illustrated in FIG. 7, a moment $M_2$ of force tending to turn the hub 4 in a counterclockwise direction acts on the hub 4, as viewed in FIG. 7. This moment $M_2$ of force tends to bring the hub 4 into alignment with the inner surface of the annular wall 2a, and hence the hub 4 is brought naturally into alignment with the annular wall 2a of the spindle hub 2 as the hub 4 and the collet 5 are moved deeper into the cavity 2b of the spindle hub 2.

SUMMARY OF THE INVENTION

Accordingly, in view of the above-mentioned technical background, it is an object of the present invention to provide a disk clamping mechanism capable of accurately centering a disk on a spindle hub and having no possibility of damaging the periphery of the central hole of the disk in centering the disk on the spindle hub.

The object of the invention is achieved by a disk clamping mechanism comprising a rotary system capable of rotating together with a spindle hub and including a rotary member capable of clamping a disk between the lower surface thereof and the upper surface of the spindle hub, and a nonrotational system for supporting the rotary system, wherein the rotary system is connected swingably to the nonrotational system by a connecting member, a connecting position between the rotary system and the nonrotational system is located below a disk clamping surface so that the center of swing motion of the rotary system is located at least below the disk clamping surface on the side of the cavity of the spindle hub so that the rotary members of the rotary system, such as the hub and the collet, correct their tilt by themselves, and thereby the accuracy of disk centering is improved.

The above and other objects, features and advantages of the present invention will become more apparent from the following description of a preferred embodiment thereof taken in conjunction with the accompanying drawings.

BRIEF DESCRIPTION OF THE DRAWINGS

In FIGS. 1 to 7, like reference characters designate like or corresponding parts throughout.

DESCRIPTION OF THE PREFERRED EMBODIMENTS

Figure 1:
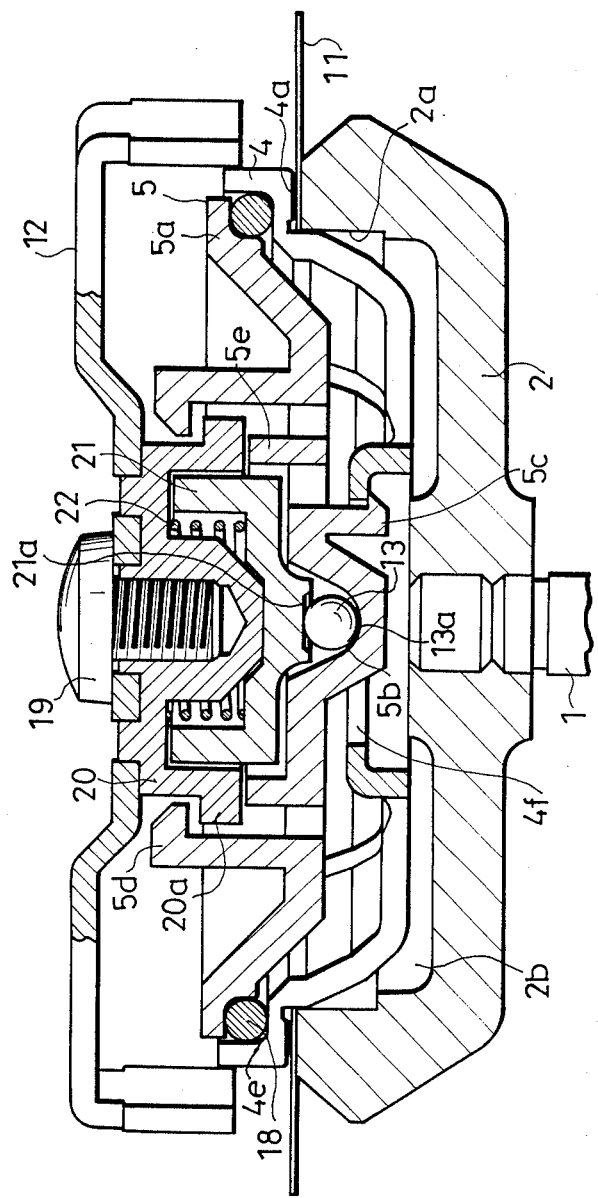
FIG. 1 is a sectional view of a disk clamping mechanism, in a preferred embodiment, according to the present invention, in which a rotary system and a nonrotational system are associated with each other by means of a ball.
Figure 2:
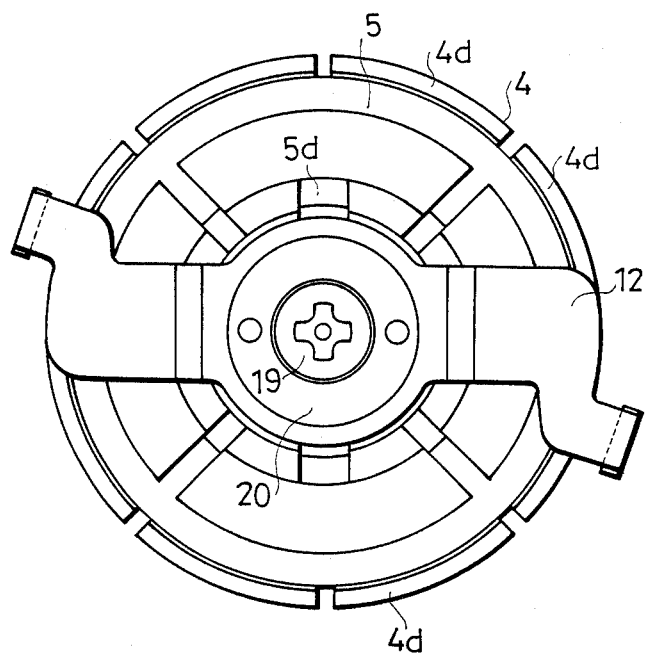
FIG. 2 is a plan view of the disk clamping mechanism of FIG. 1.

Referring to FIGS. 1 and 2, a disk clamping mechanism, in a first embodiment, according to the present invention generally comprises a rotary system capable of rotating together with a spindle hub 2 in an integral unit and a nonrotational system which supports the rotary system rotatably through a ball 13.

The rotary system includes a hub 4 for directly pressing a disk 11 against the upper surface of the spindle hub 2, and a collet 5 for pressing the hub 4 toward the spindle hub 2. An O-ring 18 is provided between the flange 4a of the hub 4 and the flange 5a of the collet 5.

The nonrotational system includes a carrier 12 supported on a clamping arm, not shown, so as to move the disk clamping mechanism toward and away from the spindle hub 2, a collet supporting member 20 for supporting the collet 5, fastened to the carrier 12 with a screw 19, a ball receptacle 21 loosely fitted in the collet supporting member 20, and a spring 22 urging the ball receptacle 21 away from the collet supporting member 20.

The hub 4 is an assembly of a plurality of segments 4d each made of a flexible synthetic resin and has the shape of a circular bowl. The hub 4 has a flange 4a forming the upper periphery thereof and capable of pressing the disk 11, an O-ring mounting part 4e formed in the upper side of the flange 4a, and a central hole 4f formed in the bottom thereof for receiving and engaging a portion of the collet 5.

The collet 5 has a central concave part 5b formed in the bottom thereof so as to receive a ball 13 therein and to protrude through the central opening 4f of the hub 4 toward a spindle 1, hooks 5c projecting from the outer circumference of the concave part 5b so as to engage the periphery of the central hole 4f, and hooks 5d projecting upward from the inner circumference of the flange 5a so as to engage the collet supporting member 20. The collet 5 is formed of synthetic resin as an integral member.

In assembling the hub 4 and the collet 5, the O-ring 18 is placed on the O-ring mounting part 4e of the hub 4, and then the collet 5 is put on the hub 4 so that the concave part 5b protrudes through the central hole 4f of the hub 4 and the hooks 5c engage the periphery of the central hole 4f. The O-ring 18 is held between the flange 4a of the hub 4 and the flange 5a of the collet 5. Then, the ball 13 is put in the concave part 5b, and then the ball receptacle 21 is put on the ball 13 so that the ball 13 is received in a recess 21a formed in the bottom surface of the ball receptacle 21. Then, the compression coil spring 22 is put in the ball receptacle 21, and then the collet supporting member 20 is pushed into the interior of the collet 5 so that the flange 20a of the collet supporting member 20 enters the interior of the collet 5 over the hooks 5d of the collet 5 and engages the hooks 5d. Then, the collet supporting member 20 is fastened to the carrier 12 with a screw 19 to complete the disk clamping mechanism.

In this disk clamping mechanism, the contact point 13a between the ball 13 and the inner surface of the concave part 5b of the collet 5 is located on the lower side toward the spindle 1 with respect to the disk clamping surface, namely, below the upper surface of the flange 4a of the hub 4.

The hub 4 and the collet 5 are movable in the axial direction by a distance corresponding to the stroke of the flange 20a of the collet supporting member 20 between the hooks 5d and an annular wall 5e formed along the periphery of the concave part 5b of the collet 5. When the disk clamping mechanism is raised to unclamp the disk 11, the compression coil spring 22 expands to urge the hub 4 away from the collet supporting member 20 so that the hub 4 will not be tilted relative to the collet supporting member 20. The constitution of the rest of the parts not described herein is the same as that of the corresponding parts of the conventional disk clamping mechanism.

The function and effect of the disk clamping mechanism thus constituted will be described hereinafter.

When the disk 11 is inserted through the disk inlet of a disk driving device, not shown, into the disk driving device to a predetermined position and the door, not shown, for closing the disk inlet is closed, the clamping arm is actuated to move the carrier 12 holding the hub and other parts at the extremity thereof toward the spindle hub 2. As the carrier 12 is lowered, the protruding part of the hub 4 enters the cavity 2b of the spindle hub 2. As the carrier 12 is lowered further, the side surfaces of the segments 4d of the hub 4 are brought into contact with the annular wall 2a of the spindle hub 2, and thereby the disk 11 is centered. Finally, the flange 4a of the hub 4 comes into contact with the upper surface of the disk 11. When the door is closed completely, the collet 5 is pressed toward the spindle 1 through the ball 13 by the ball receptacle 21, whereby the flange 4a of the hub 4 is pressed through the O-ring 18 by the flange 5a of the collet 5, so that the disk 11 is clamped between the lower surface of the flange 4a and the upper surface of the spindle hub 2.

Then, when the motor is actuated, the spindle hub 2 is rotated through the spindle 1, and thereby the disk 11, the hub 4 and the collet 5 are rotated in an integral unit, while a recording/reproducing head, not shown, moves in sliding contact with the disk 11 for recording or reproducing.

When the hub 4 is fitted into the cavity 2b of the spindle hub in a tilted position during the disk clamping operation, first, the side surface of one of the segments 4d of the hub 4 nearest to the spindle 1 comes into contact with the inner periphery of the annular wall 2a. Since the joint of the rotary system and the nonrotational system, namely, the contact point 13a between the inner surface of the concave part 5b of the collet 5 and the ball 13, is located below the inner periphery of the upper surface of the annular wall 2a, as viewed in FIG. 1, a moment $M_2$ of force acts on the hub 4 so as to correct the tilt of the hub 4, and hence the disk 11 is centered correctly before the same is clamped firmly. Consequently, a uniform clamping pressure is applied to the disk 11, and thereby the disk 11 is clamped accurately, which improves the recording/reproducing characteristics of the recording/reproducing system employing the disk clamping system of the present invention.

Figure 3:
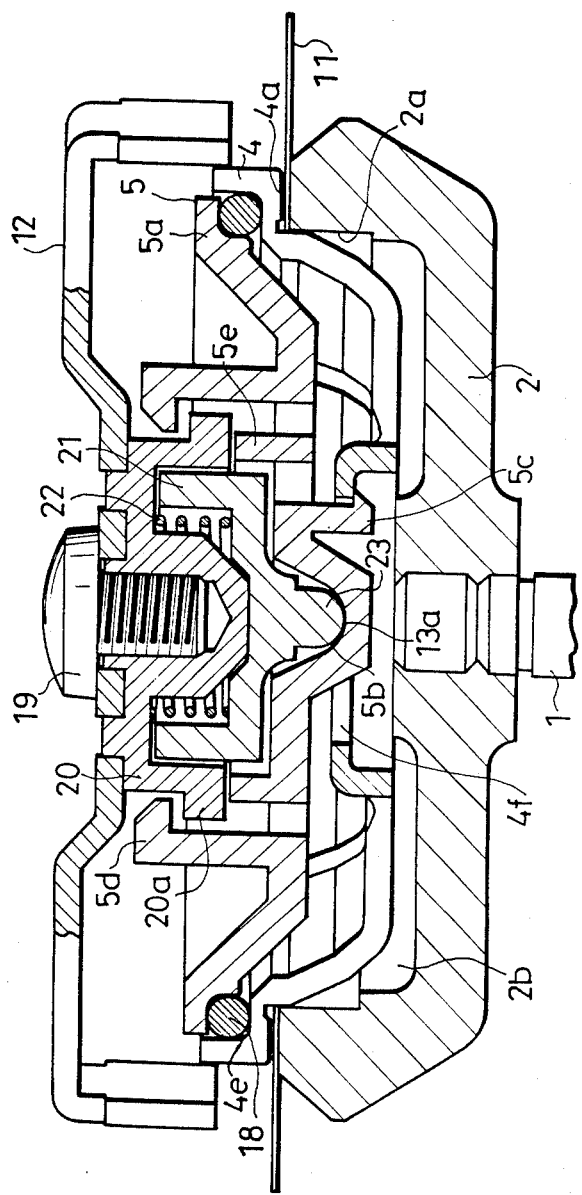
FIG. 3 is a sectional view of another embodiment of the present invention, in which a rotary system and a nonrotational system are associated with each other by means of a spherical member.
Figure 4:
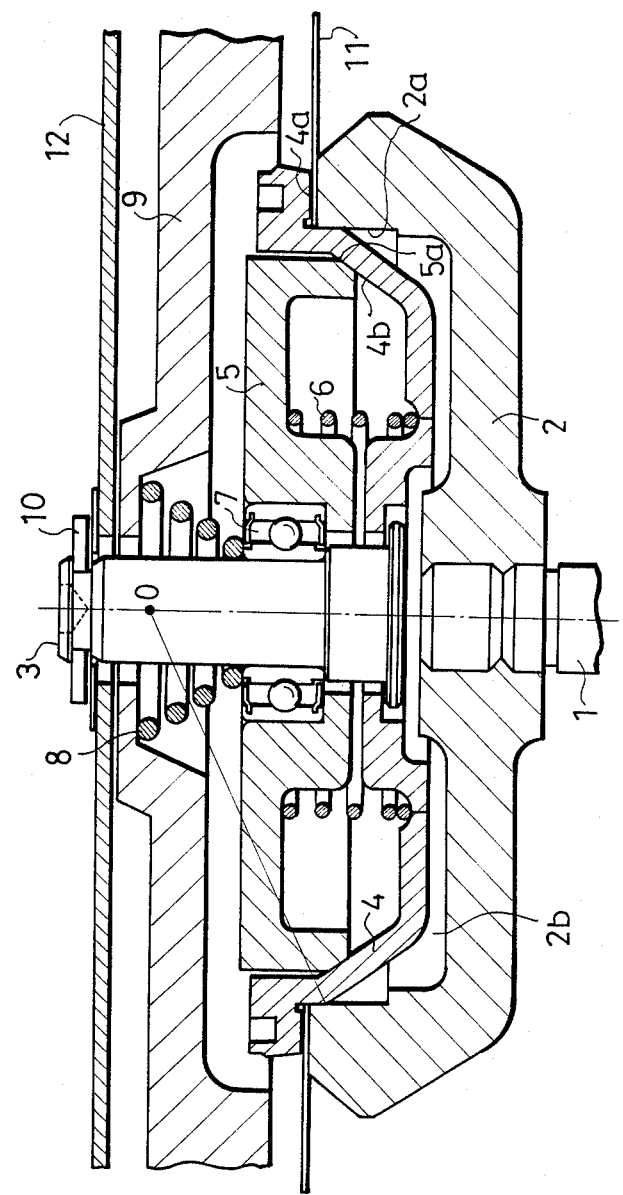
FIGS. 4 and 5 are sectional views of conventional disk clamping mechanisms, respectively.
Figure 5:
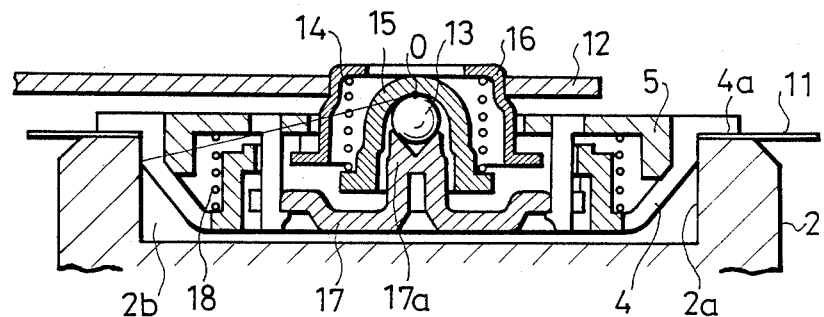
Figure 6:
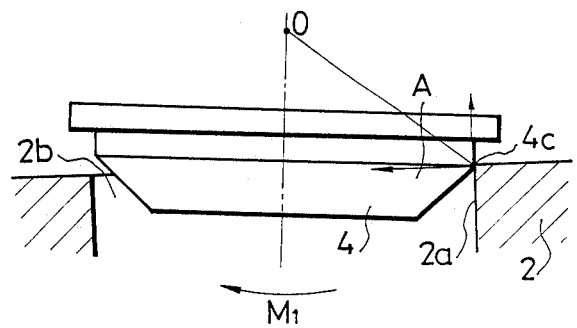
FIGS. 6 and 7 are illustrations of assistance in explaining the action of moment of force on the hub of a disk clamping mechanism.
Figure 7:
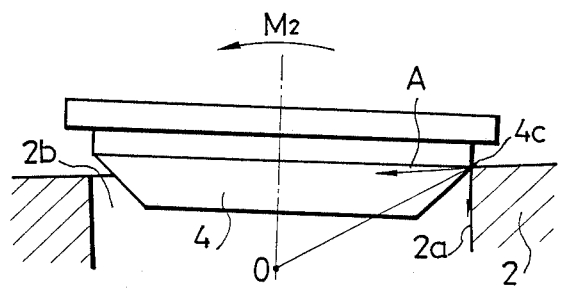

A second embodiment of the present invention is illustrated in FIG. 3. All the components of the second embodiment is the same as those of the first embodiment, except that a spherical tip 23 is formed in the ball receptacle 21 instead of the ball 13 of the first embodiment.

The spherical tip 23 may be formed, as mentioned above, integrally with the ball receptacle 21 or may be a separate member formed of a highly wear-resistant material and joined to the ball receptacle 21. The sperical tip 23 may be a sharp tip capable of tilting and rotation, such as a tip having the shape of a circular cone.

Although the invention has been described as applied to a disk clamping mechanism for clamping a flexible disk, naturally, the present invention is applicable to a disk clamping mechanism for clamping other recording mediums having the shape of a disk.

As apparent from the foregoing description, according to the present invention, the joint of the rotary system and the nonrotational system is located on the side of the corresponding spindle with respect to the disk clamping surface of one of the rotary members of the rotary system, namely, the center of swing motion of the rotary system is located on the side of the corresponding spindle with respect to the inner periphery of the upper surface of the spindle hub where the rotary system first comes into contact with the spindle hub, when the rotary system is moved toward the spindle hub. Therefore, a moment of force tending to correct the tilt of the rotary system acts on the rotary system as the rotary system is moved toward the spindle hub for clamping a disk. Accordingly, the disk clamping mechanism is capable of accurately centering the disk and has no possibility of damaging the periphery of the central hole of the disk. Furthermore, the improvement of the centering accuracy improves the disk clamping accuracy of the disk clamping mechanism, which improves the general recording/reproducing characteristics.

Although the invention has been described in its preferred form with a certain degree of particularity, it is to be understood that many changes and variations are possible in the invention without departing from the scope and spirit thereof.

What is claimed is:

1. A disk clamping mechanism for centering and clamping a magnetic recording disk having a center hole, comprising:
   a lower, rotatable spindle hub having an upper peripheral surface on which a disk is placed in a horizontal plane for rotation about a vertical rotational axis, and a central recess for centering the center hole of the disk;
   an upper clamping mechanism including;
   a rotary system having a center projecting portion inserted in the center hole of the disk and the central recess of the spindle hub for centering the disk on the spindle hub in alignment with the rotational axis, and a peripheral portion having a lower surface for clamping the disk around its center hole on the upper surface of the spindle hub, the rotary system being rotatable with the spindle hub to drive the disk in rotation;
   a nonrotational system having means for holding the rotary system and for moving it toward and away from the spindle hub; and
   means for rotatably joining said rotary system and said non-rotational system including a joining member forming a center pivot point aligned with the rotational axis between the rotary system and the nonrotational system, wherein the center pivot point of the joining member is located in the center projecting portion of the rotary system below the plane of the lower surface of the peripheral portion, so that as the center projecting portion is inserted in the central recess of the spindle hub, the center pivot point is positioned below the plane of the disk, whereby as the center projecting portion is fully inserted and the peripheral portion of the rotary system engages the upper surface of the spindle hub to center and clamp the disk thereon, the rotary system correctly centers itself with respect to the spindle hub and any tilt between the lower surface of the peripheral portion and the plane of the disk during movement of the rotary system toward the spindle hub is corrected by movement of the peripheral portion in response to the moment of pivoting force defined by the position of the joining member below the plane of the disk.

2. A disk clamping mechanism according to claim 1, wherein said rotary system comprises a clamping hub which is brought into direct contact with the disk to clamp the disk between the lower surface thereof and the upper surface of the spindle hub, a collet which presses the clamping hub in the disk clamping direction, and an elastic O-ring held between the peripheral flange of the clamping hub and the peripheral flange of the collet, and the nonrotational system comprises a carrier supported on a clamping arm for moving the assembly of the rotary system and the nonrotational system toward and away from the spindle hub, a collet supporting member fastened to the carrier with a screw, a ball receptacle loosely fitted in the collet supporting member, and a spring urging the collet supporting member and the ball receptacle away from each other.

3. A disk clamping mechanism according to claim 1, wherein said joining member is a spherical ball.

4. A disk clamping mechanism according to claim 1, wherein said joining member is a spherical tip formed integrally with the ball receptacle.

5. A disk clamping mechanism according to claim 2, wherein said clamping hub consists of a plurality of segments each made of a flexible synthetic resin.

6. A disk clamping mechanism according to claim 2, wherein said clamping hub generally has an annular upper portion, a lower portion tapering toward the spindle recess, and a flange extending radially outward from the upper periphery of the annular portion.

* * * * *